(12) United States Patent
Hammond et al.

(10) Patent No.: US 11,266,270 B2
(45) Date of Patent: Mar. 8, 2022

(54) FOOD PROCESSOR ASSEMBLY FOR A BLENDER BASE

(71) Applicant: Vita-Mix Management Corporation, Olmsted Township, OH (US)

(72) Inventors: Rebecca Hammond, Cleveland, OH (US); David Kolar, Stow, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 455 days.

(21) Appl. No.: 15/789,321

(22) Filed: Oct. 20, 2017

(65) Prior Publication Data

US 2018/0338643 A1 Nov. 29, 2018

Related U.S. Application Data

(60) Provisional application No. 62/510,040, filed on May 23, 2017.

(51) Int. Cl.
*A47J 43/046* (2006.01)
*A47J 43/08* (2006.01)

(52) U.S. Cl.
CPC ........... *A47J 43/046* (2013.01); *A47J 43/085* (2013.01)

(58) Field of Classification Search
CPC ...... A47J 43/046; A47J 43/07; A47J 43/0716; A47J 43/085; B01F 7/162
See application file for complete search history.

(56) References Cited

U.S. PATENT DOCUMENTS

| 4,942,781 A | * | 7/1990 | Hori | F16H 1/46 475/342 |
| 5,405,096 A | * | 4/1995 | Seol | A47J 19/027 241/282.1 |

(Continued)

FOREIGN PATENT DOCUMENTS

| CA | 2974751 A1 | 9/2017 | |
| EP | 2085005 A1 * | 8/2009 | ............ A47J 43/046 |
| WO | 2016191538 A1 | 12/2016 | |

OTHER PUBLICATIONS

Translation of Martin et al. (Year: 2009) (Reference is to equivalent WO doc).*

(Continued)

*Primary Examiner* — Erin E McGrath
(74) *Attorney, Agent, or Firm* — McDonald Hopkins LLC

(57) ABSTRACT

A food processor assembly is provided with a bowl with a substrate sized to be supported upon a blender base, and a sidewall to collectively define a bowl cavity to receive food products. A planetary gear transmission is supported upon the bowl substrate with a rotary input sized to receive a blender rotary output. A first transmission rotary output extends into the bowl cavity to provide a reduced rotation from the rotary input. A blade is connected to the first transmission rotary output for rotation relative to the bowl substrate to perform a cutting operation to a food product. The blade has a first cutting edge formed adjacent the first transmission rotary output to perform a continuous cutting operation to the food products. The blade has a second cutting edge spaced radially from the first transmission rotary output to perform a sequential cutting operation to the food products.

11 Claims, 6 Drawing Sheets

(56) References Cited

U.S. PATENT DOCUMENTS

| | | | |
|---|---|---|---|
| 6,251,040 B1* | 6/2001 | Safont | A47J 43/0716 |
| | | | 475/299 |
| 6,690,128 B1 | 2/2004 | Cotton et al. | |
| 7,566,186 B2* | 7/2009 | Katz | A47J 43/085 |
| | | | 403/293 |
| 7,685,933 B2 | 3/2010 | Fevbre | |
| 7,686,240 B2 | 3/2010 | Pryor, Jr. et al. | |
| 8,506,437 B2 | 8/2013 | Cheung et al. | |
| 2002/0141286 A1* | 10/2002 | Wulf | A47J 43/0727 |
| | | | 366/206 |
| 2010/0199823 A1 | 8/2010 | Dalla Piazza et al. | |
| 2012/0167712 A1* | 7/2012 | Cheung | B26D 3/11 |
| | | | 241/101.4 |
| 2014/0299687 A1* | 10/2014 | Rosenzweig | A47J 43/087 |
| | | | 241/30 |
| 2016/0101533 A1 | 4/2016 | Aramburo et al. | |
| 2016/0256005 A1 | 9/2016 | Dickson, Jr. et al. | |
| 2016/0256006 A1 | 9/2016 | Dickson, Jr. et al. | |
| 2016/0256007 A1 | 9/2016 | Dickson, Jr. et al. | |
| 2016/0256008 A1 | 9/2016 | Dickson, Jr. et al. | |
| 2016/0256839 A1 | 9/2016 | Dickson, Jr. et al. | |
| 2017/0105578 A1* | 4/2017 | Krebs | A47J 43/04 |
| 2017/0172347 A1 | 6/2017 | Potter | |

OTHER PUBLICATIONS

Oster Pro™ 1200, User Manual, 2015, 40 pages.
Veggie Bullet Cookbook, 2016, 17 pages.

* cited by examiner

FOOD PROCESSOR ASSEMBLY FOR A BLENDER BASE

CROSS-REFERENCE TO RELATED APPLICATIONS

This application claims the benefit of U.S. provisional application Ser. No. 62/510,040 filed May 23, 2017, the disclosure of which is hereby incorporated in its entirety by reference herein.

TECHNICAL FIELD

Various embodiments are directed to food processor assemblies for a blender base.

BACKGROUND

The prior art has provided food processors and spiralizers. The prior art has also provided blender assemblies.

SUMMARY

According to at least one embodiment, a food processor assembly is provided with a bowl with a substrate sized to be supported upon a blender base, and a sidewall to collectively define a bowl cavity to receive food products. A planetary gear transmission is supported upon the bowl substrate with a rotary input sized to receive a blender rotary output from the blender base. A first transmission rotary output extends into the bowl cavity to provide a reduced rotation from the rotary input. A blade is connected to the first transmission rotary output for rotation relative to the bowl substrate to perform a cutting operation to a food product.

According to at least another embodiment, a food processor assembly is provided with a bowl with a substrate sized to be supported upon a blender base, and a sidewall to collectively define a bowl cavity to receive food products. A planetary gear transmission is supported upon the bowl substrate with an input shaft sized to receive a blender rotary output from the blender base. A first transmission rotary output extends into the bowl cavity to provide a first reduced rotation from the blender rotary output. A second transmission rotary output extends into the bowl cavity to provide a second reduced rotation from the blender rotary output. A blade is connected to one of the first transmission rotary output and the second transmission rotary output for rotation relative to the bowl substrate to perform a cutting operation to a food product.

According to another embodiment, a food processor assembly is provided with a bowl with a substrate sized to be supported upon a blender base, and a sidewall to collectively define a bowl cavity to receive food products. A transmission is supported upon the bowl substrate with a rotary input sized to receive a blender rotary output from the blender base. A first transmission rotary output extends into the bowl cavity to provide a reduced rotation from the rotary input. A blade is connected to the first transmission rotary output for rotation relative to the bowl substrate to perform a cutting operation to a food product. The blade has a first cutting edge formed adjacent the first transmission rotary output to perform a continuous cutting operation to the food products. The blade has a second cutting edge spaced radially from the first transmission rotary output to perform a sequential cutting operation to the food products.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
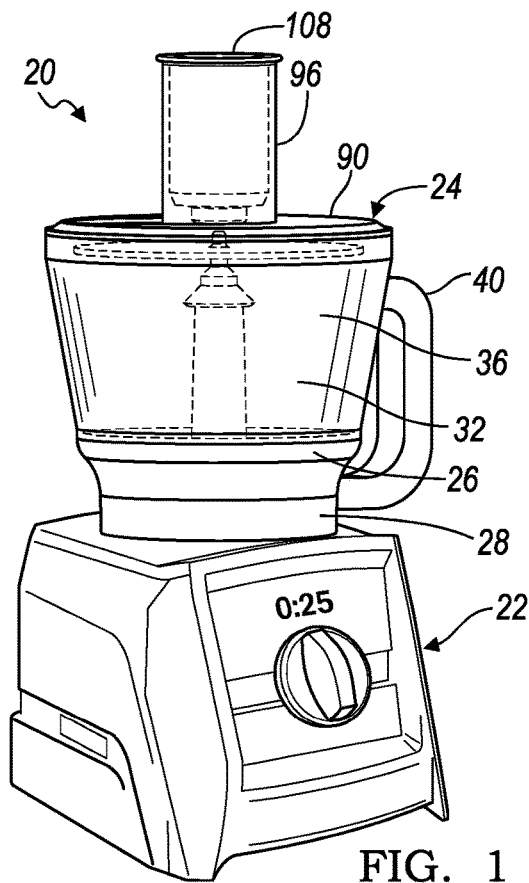
FIG. 1 is a perspective view of a food processor assembly and blender base according to an embodiment.

FIG. 1 illustrates a counter-top food appliance 20 according to an embodiment. The appliance 20 includes a blender base 22 for receiving a blender attachment (not shown) with a blender container and blender blade for blending food items. The blender base 22 provides a high output speed, up to 22,500 rotations per minute (RPM) to provide a blending operation. Since blender bases 22 are capable of providing relatively high output speeds, blender bases 22 are typically not utilized for lower speed operations, such as food processing, including slicing, shredding and spiralizing. The food appliance 20 includes a food processor assembly 24 for cooperation with the blender base 22.

Figure 2:
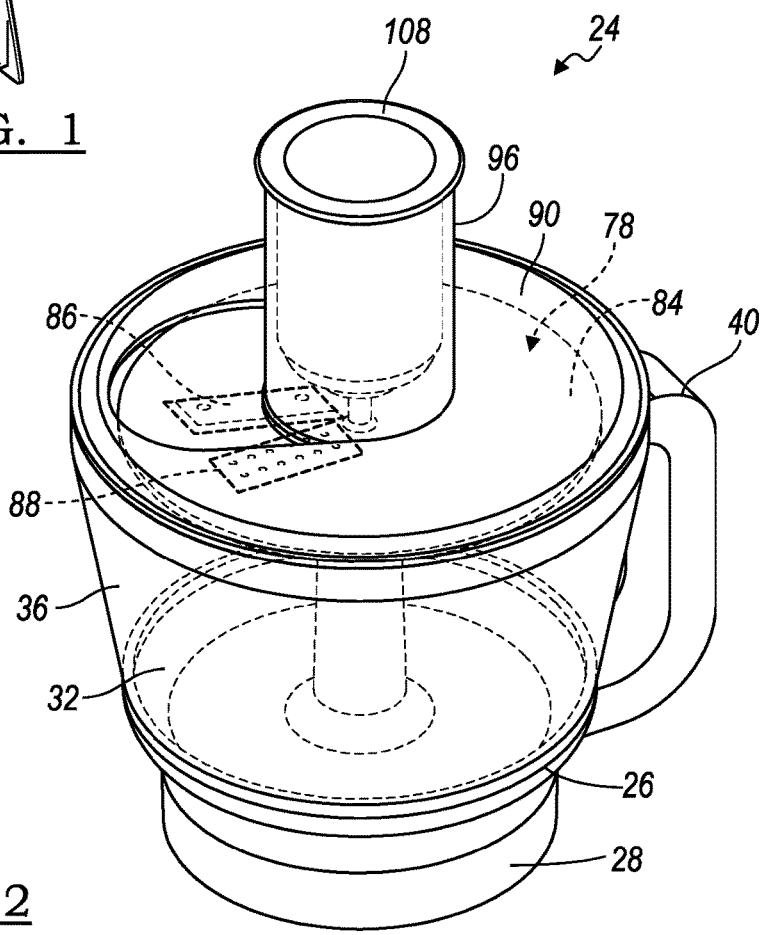
FIG. 2 is a perspective view of the food processor assembly of FIG. 1.
Figure 3:
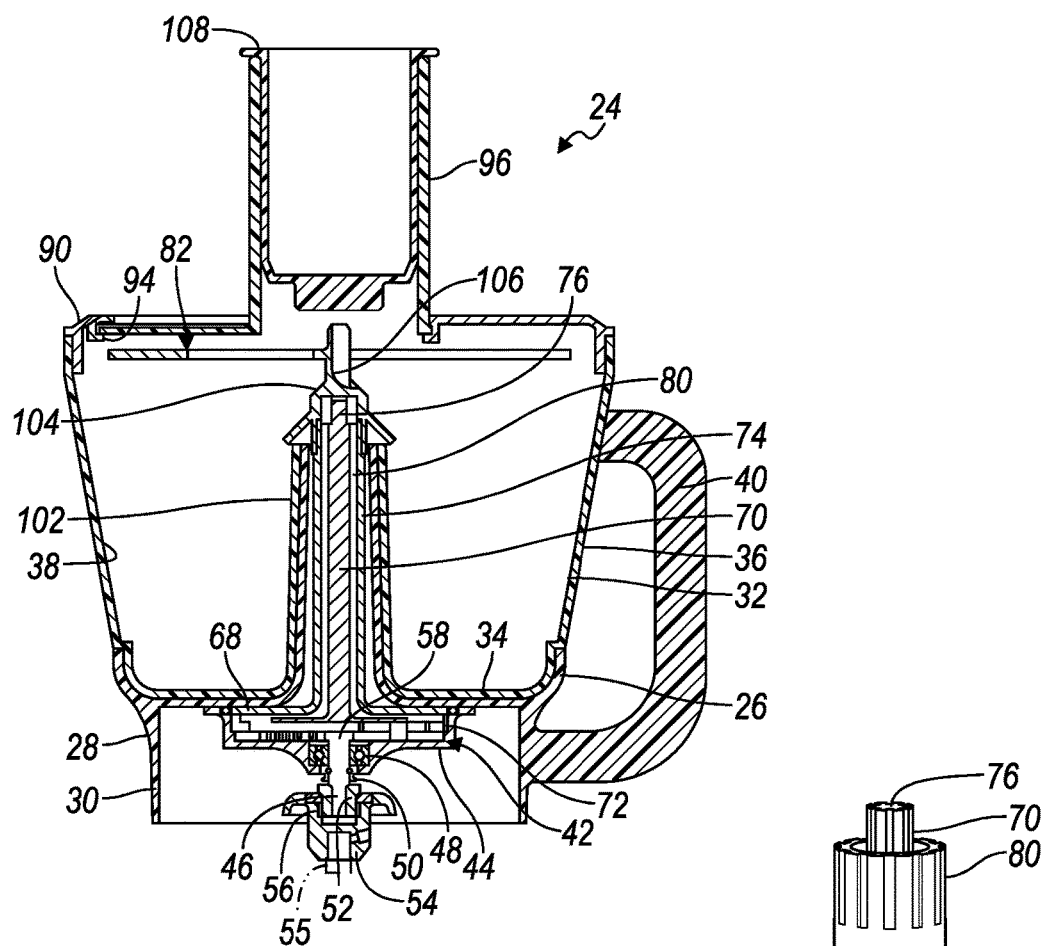
FIG. 3 is a side section view of the food processor assembly of FIG. 1.

The food processor assembly 24 is illustrated in FIGS. 1-3. The food processor assembly 24 cooperates with the blender base 22 to receive a rotary input from the blender base 22 to slice, shred and spriralize food items. The food processor assembly 24 includes a substrate 26 with a lower continuous peripheral sidewall 28 that extends below to substrate 26 to rest upon the blender base 22. The lower sidewall 28 provides a lower cavity 30 (FIG. 3) to conceal a coupling between the blender base 22 and the food processor assembly 24.

Referring again to FIGS. 1-3, the food processor assembly 24 also includes a bowl 32 to collect the processed food items. The bowl 32 also includes a substrate 34 (FIG. 3) received upon the food processor substrate 26. The bowl 32 includes an upper continuous peripheral sidewall 36 that defines a bowl cavity 38 to receive the processed food items within the bowl 32. The bowl 32 is formed from a translucent polymeric material to permit the user to view the food items within the bowl cavity 38. The bowl 32 may be formed integrally with the food processor substrate 26. However, the food processor substrate 26 may be formed of an opaque polymeric material to conceal the coupling with the blender base 22.

Referring again to FIGS. 1-3, the food processor assembly 24 also includes a handle 40 for handling by the user. The handle 40 extends from the lower sidewall 28 of the food processor substrate 26 and extends to the bowl sidewall 36.

Now, with reference to FIGS. 3-6, the food processor assembly 24 includes a transmission 42 to receive the high-speed rotary input from the blender base 22, and to reduce the rotary input to appropriate speeds for the food processing operations. The transmission 42 includes a transmission housing 44 fastened to an underside of the food processor substrate 26. The transmission 42 includes an input shaft 46 (FIGS. 3, 4 and 6) supported by bearings 48 (FIG. 3) on the housing 44. The input shaft 46 extends through seals 50 on the housing 44 and out of the housing 44 to provide the rotary input to the transmission 42. The input shaft 46 includes a splined distal end 52 (FIGS. 3 and 4) extending away from the transmission 42.

FIG. 3 illustrates a coupling 54 of the blender base 22. The coupling 54 is driven by a rotary output shaft 55 of the blender base 22. The coupling 54 includes an internally splined receptacle 56 that is sized to receive the splined distal end 52 to provide a detachable connection between the blender base 22 and the food processor assembly 24.

Figure 5:
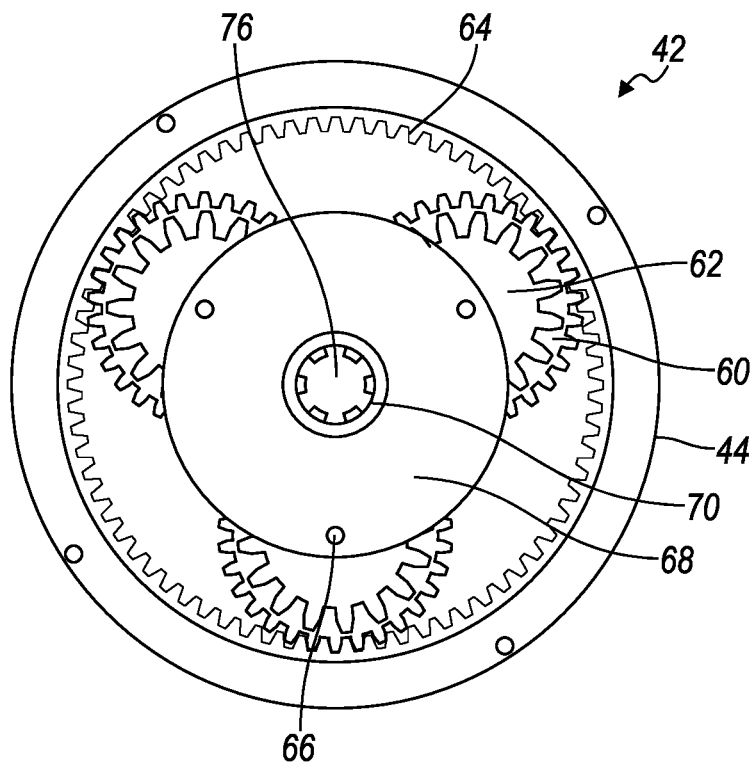
FIG. 5 is a top perspective view the transmission of FIG. 4, illustrated partially disassembled.
Figure 6:
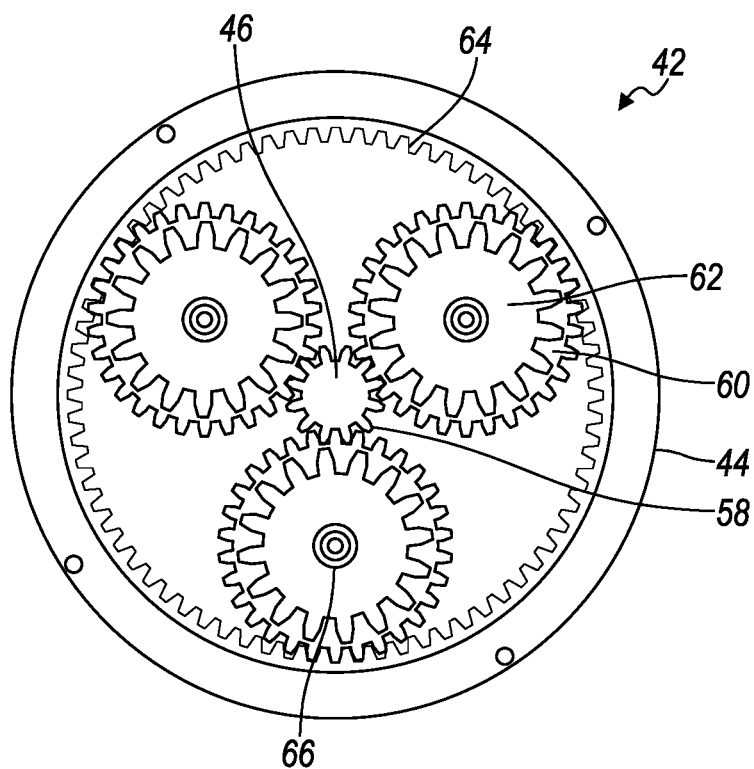
FIG. 6 is a top plan view of the transmission of FIG. 4, illustrated further disassembled.

The transmission 42 is a planetary gear transmission 42. The input shaft 46 includes a proximal end 58 (FIGS. 3 and 6) that extends into the transmission housing 44 and is formed as a sun gear 58 of the transmission 42. As shown in FIG. 6, the sun gear 58 is engaged with a plurality of first planet gears 60. Referring to FIGS. 5 and 6, the quantity of the first planet gears 60 depicted is three, however, any suitable quantity is contemplated. The first planet gears 60 are each connected to and coaxial with a second planet gear 62 of a smaller diameter. Each first planet gear 60 is connected to one of the second planet gears 62 to rotate together. The first planet gears 60 and the corresponding second planet gears 62 may be formed integrally.

As depicted in FIGS. 5 and 6, a stationary internal ring gear 64 is formed within the transmission housing 44. Each of the first planet gears 60 is engaged with the stationary internal ring gear 64 to revolve in the transmission housing 44 as each first planet gear 60 is rotated by the sun gear 58 (FIG. 6). The first planet gears 60 and the second planet gears 62 are each supported upon a bearing assembly 66 (FIG. 6). The bearing assemblies 66 are each connected to a planet carrier 68 (FIG. 5). A central rotary output shaft 70 (FIGS. 3-5) extends from the planet carrier 68, and is driven by the planet carrier 68. The central rotary output shaft 70 and the planet carrier 68 may be formed integrally. The central rotary output shaft 70 and the planet carrier 68 are supported for rotation relative to the transmission housing 44. The central rotary output shaft 70 extends into the bowl cavity 38 to provide a first transmission rotary output with a reduced rotation from the blender rotary output of the blender base 22. The reduced rotation of the central rotary output shaft 70 permits a maximum speed of 2,000 RPM, and consequently a much higher output torque than that provided at the first rotary input.

In summary, the coupling 54 (FIG. 3) is driven for rotation by the blender base 22, and consequently rotates the input shaft 46 (FIGS. 3, 4 and 6) so that the sun gear 58 (FIGS. 3 and 6) imparts rotation to the first planet gears 60 (FIGS. 5 and 6), which rotate relative to the planet carrier 68 (FIGS. 3 and 5) and revolve relative to the transmission housing 44 due to the engagement with the fixed ring gear 64 (FIGS. 5 and 6), whereby the revolving first planet gears 60 (FIGS. 5 and 6) rotate the planet carrier 68 (FIGS. 3 and 5) and consequently the central rotary output shaft 70 (FIGS. 3-5) at the reduced speed relative to the input speed.

Figure 4:
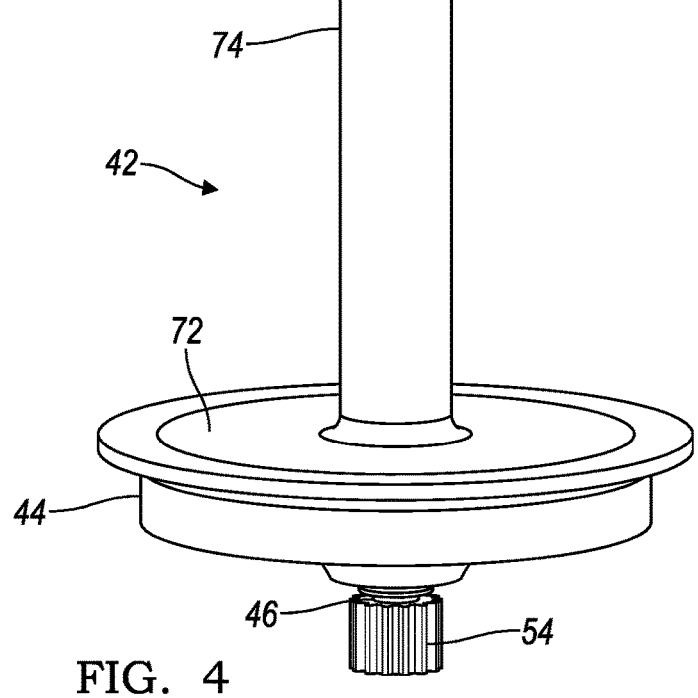
FIG. 4 is a side perspective view of a transmission of the food processor assembly of FIG. 1, according to an embodiment.

The second planet gears 62 (FIGS. 5 and 6) engage a rotatable internal ring gear 72 (FIGS. 3 and 4). A hollow rotary output shaft 74 (FIGS. 3 and 4) extends from the rotatable internal ring gear 72 into the bowl cavity 38 to provide a second transmission rotary output with a reduced rotation from the blender rotary output of the blender base 22. The hollow rotary output shaft 74 is coaxial with the central rotary output shaft 70. The reduced rotation of the hollow rotary output shaft 74 permits a maximum speed of 300 RPM, and consequently a much higher output torque than that provided at the first rotary input and that provided at the central rotary output shaft 70.

In summary, the coupling 54 (FIG. 3) is driven for rotation by the blender base 22, and consequently rotates the input shaft 46 (FIGS. 3, 4 and 6) so that the sun gear 58 (FIGS. 3 and 6) imparts rotation to the first planet gears 60 and the second planet gears 62 (FIGS. 5 and 6), which rotate relative to the planet carrier 68 (FIGS. 3 and 5) and revolve relative to the transmission housing 44 due to the engagement of the first planet gears 60 with the fixed ring gear 64 (FIGS. 5 and 6), whereby the revolving and rotating second planet gears 62 (FIGS. 5 and 6) rotate the rotatable internal ring gear 72 (FIGS. 3 and 4) and consequently the hollow rotary output shaft 74 (FIGS. 3 and 4) at the reduced speed relative to the input speed.

The central rotary output shaft 70 has a distal end 76 (FIGS. 3-5) that is splined to engage and impart rotation upon a food processor blade assembly 78 (FIG. 2). The hollow rotary output shaft 74 has a distal end 80 (FIGS. 3 and 4) that is splined to engage and impart rotation upon a spiralizer blade assembly 82 (FIG. 3). The transmission 42 provides a dual ratio gear set with different interfaces at the central rotary output shaft distal end 76 and the hollow rotary output shaft distal end 80 for the different blade assemblies 78, 82. Although two shafts 70, 74 are illustrated and described, a single output shaft 70, 74 is contemplated for providing the reduced rotary output. In the single output shaft 70, 74 alternative, the blender rotary output of the blender base 22 may be controlled manually or automatically to provide the reduced rotary output speed of the desired operation—cutting, slicing and shredding, or spiralizing.

Referring again to FIG. 2, the food processor blade assembly 78 includes a disc 84 with a horizontal blade 86 for slicing and chopping of food items. The food processor blade assembly 78 also includes an array of vertical blades 88 for shredding. The horizontal blade 86 and the vertical blades 88 may have cutting edges formed on opposed surfaces of the disc 84 so that the user can select a cutting operation by placement of the disc 84 during installation. The food processor assembly 24 includes a lid 90 sized to engage an upper periphery of the bowl sidewall 36 to enclose the bowl cavity 38. The lid 90 may also be formed of a translucent polymeric material to permit the user to view the food processing operations performed within the bowl 32.

Figure 7:
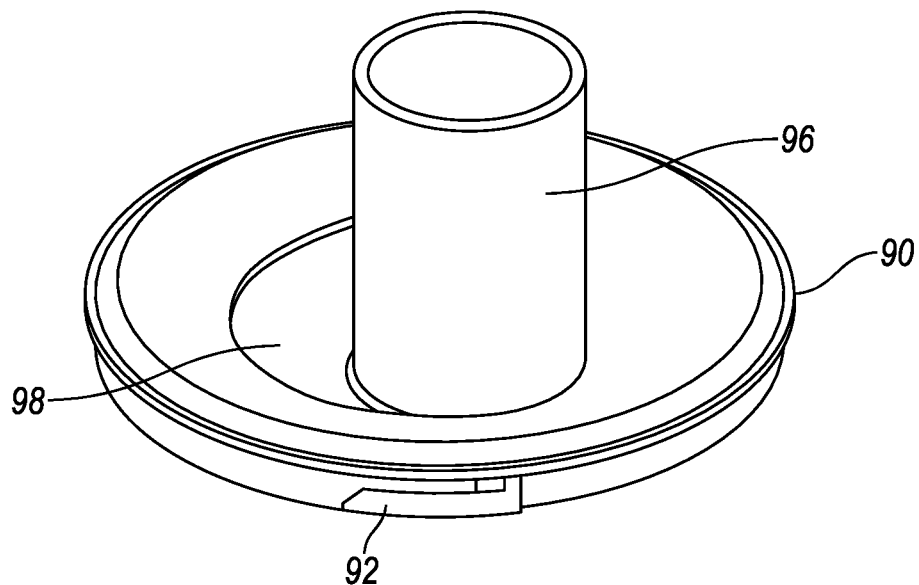
FIG. 7 is a top perspective view of a lid assembly of the food processor assembly of FIG. 1, illustrated with a food tube in a food processor position, according to an embodiment.
Figure 8:
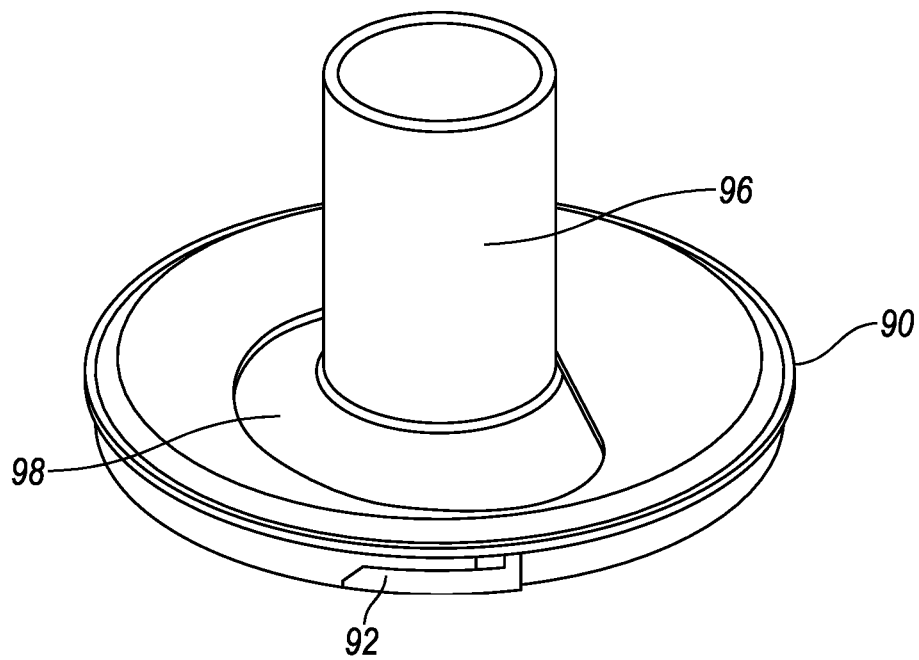
FIG. 8 is a top perspective view of the lid assembly of FIG. 7, illustrate with the food tube in a spiralizer position.
Figure 9:
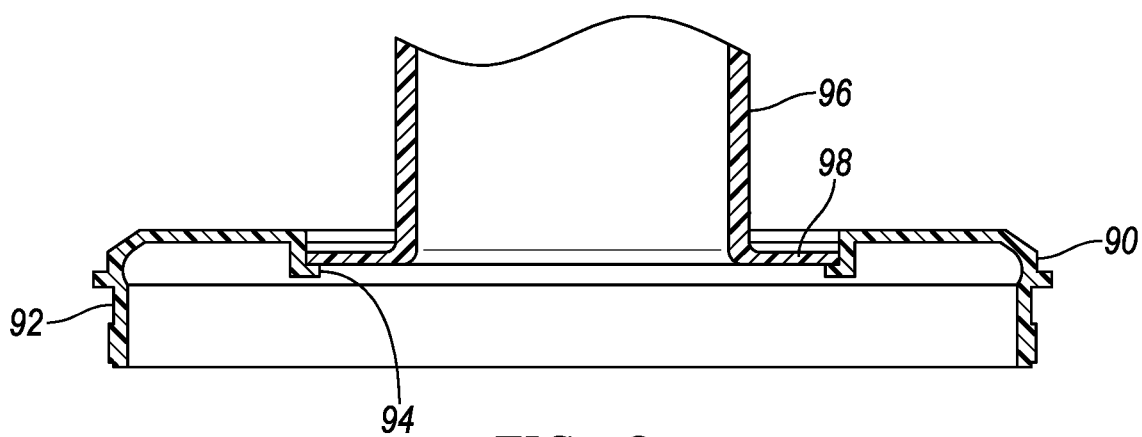
FIG. 9 is a side section view of the lid assembly of FIG. 7.

The lid 90 is illustrated in greater detail in FIGS. 7-9. The lid 90 may include external ramps 92 to engage within slots within the bowl 32 to lock the lid 90 to the bowl 32. Food processing operations such as slicing, shredding, and chopping required a single cut to be made for each rotation of the disc 84 resulting in a sequential cutting operation. Since a single slice is made for each rotation of the disc 84, the food items are presented radially off set, or off-center of the disc 84. The lid 90 includes an input port 94 (FIGS. 3 and 9) formed through the lid 90 to permit food items to be inserted into the bowl cavity 38.

A tube 96 (FIGS. 1-3 and 7-9) cooperates with lid 90 to be movable relative to the input port 94. For example, the tube 96 includes a flange 98 (FIGS. 7-9) that cooperates with the lid 90 to permit the tube 96 to be translated relative to the input port 94 to multiple positions. The flange 98 also cooperates with the lid 90 to cover the input port 94 in areas wherein the tube 96 is not aligned to permit the introduction of food items through the lid 90 to only pass through the tube 96.

In FIG. 7, the tube 96 is positioned radially offset from a center of the lid 90. This position introduces the food items to the disc 84 radially offset from center so that the cutting operation is periodic and sequential for slicing, chopping or shredding. In FIG. 7, the tube 96 is positioned centrally relative to the lid 90 and consequently the disc 84. This alignment permits food items to contact a cutting edge, such as the array of vertical blades 88 continuously for continuous cutting operations along a length of a food item. The central orientation of the tube 96 provides a cutting operation commonly referred to as spiralizing, to create food items such as vegetable noodles by rotating the blades 88 around a center of the food item.

With reference again to FIG. 3, the bowl 32 includes a shroud 102 that extends over the output shafts 70, 74. The spiralizer disc assembly 82 includes a hub 104 mounted to the hollow rotary output shaft distal end 80. The hub 104 includes a central corer blade 106 to remove the core of a food item during a spiralizer cutting operation. Referring again to FIGS. 7-9, the tube 96 can be positioned by manual translation of the tube 96 to the desired location. Magnets or other fasteners may be provided on the flange 98 and the lid 90 to maintain the tube 96 in the selected position. Now with reference to FIGS. 1-3, the food processor assembly 24 may include a tamper 108 for manual translation of food items through the tube 96.

The food appliance 20 may be equipped with a near-field communication (NFC) system for detecting the selected blade assembly 78, 82 and orientation of the blade assembly 78, 82 to select a corresponding blender rotary output from the blender base 22 that is associated with the selected cutting operation. The lid 90 and the tube 96 may also be equipped the NFC system to ensure that the tube 96 is in the appropriate position for the selected cutting operation based upon the selected blade assembly 78, 82. A NFC system is disclosed in Kolar U.S. Provisional Patent Application Ser. No. 62/469,883, filed on Mar. 10, 2017, the disclosure of which is incorporated in its entirety by reference herein.

Figure 10:
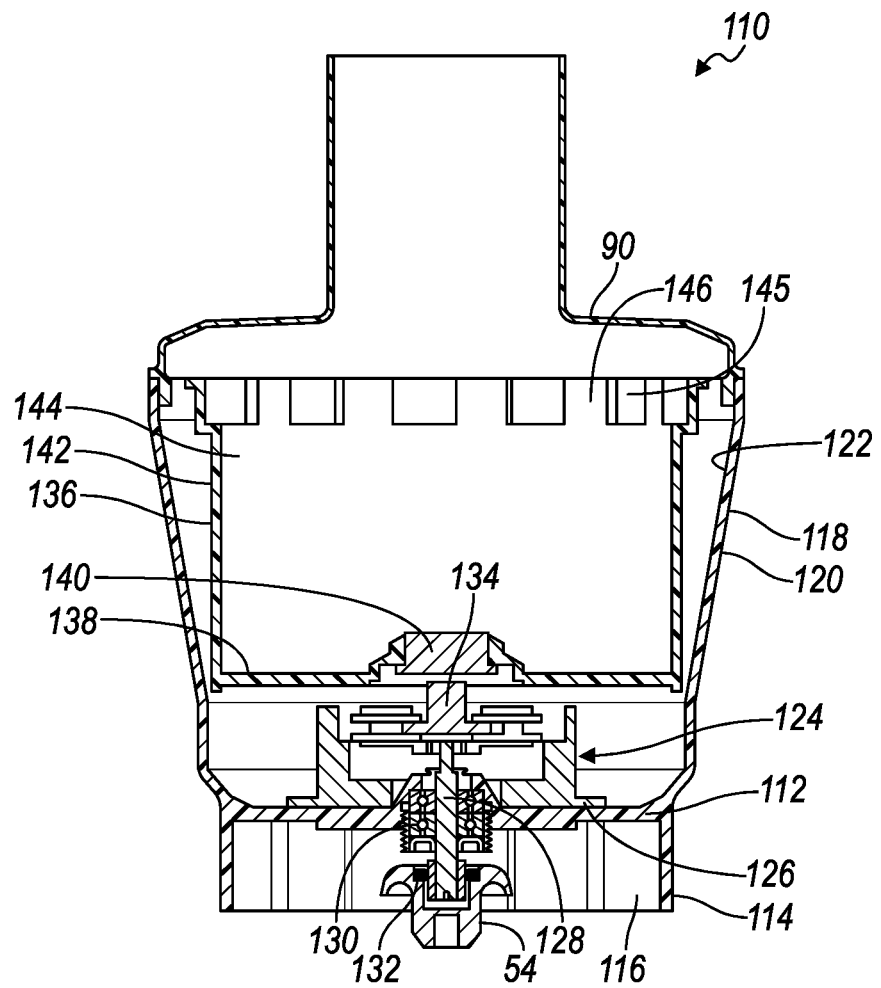
FIG. 10 is a side section view of a food processor assembly according to another embodiment.

Referring now to FIG. 10, a food processor assembly 110 is illustrated according to another embodiment. The food processor assembly 110 includes a substrate 112 with a lower sidewall 114 for creating a cavity 116 to conceal the coupling 54 of the blender base 22. The food processor assembly 110 includes a primary bowl 118 formed integrally with the substrate 112 with a sidewall 120 extending upward from the substrate 112 to provide a primary bowl cavity 122.

A transmission 124 is provided in the primary bowl cavity 122 with a transmission housing 126 mounted to the substrate 112. The transmission 124 includes an input shaft 128 extending through bearings 130 and seals 132 on the substrate 112 to engage the coupling 54. The transmission 124 is a single reduction planetary gear transmission 124 with an output shaft 134. A secondary bowl 136 is provided with a substrate 138 with a coupling 140 attached to the output shaft 134. A sidewall 142 extends from the secondary bowl substrate 138 to provide a cavity 144 to receive food items.

The secondary bowl 136 is rotated by the transmission 124. A distal region of the secondary bowl sidewall 142 includes a peripheral series of recesses 145 and lugs 146 to receive and connect with a blade assembly (not shown). The blade assembly is rotated with the secondary bowl 136 so that food items that are cut are received within the secondary bowl cavity 144. By rotating the secondary bowl 136, the output shaft 134 does not extend through the secondary bowl 136. Likewise, a corer is eliminated because the vertical blades for a spiralizer operation can be extended to a center of the blade assembly. The food processor assembly 110 utilizes the lid 90 of the prior embodiment. The lid 90 connects to the primary bowl 118.

Figure 11:
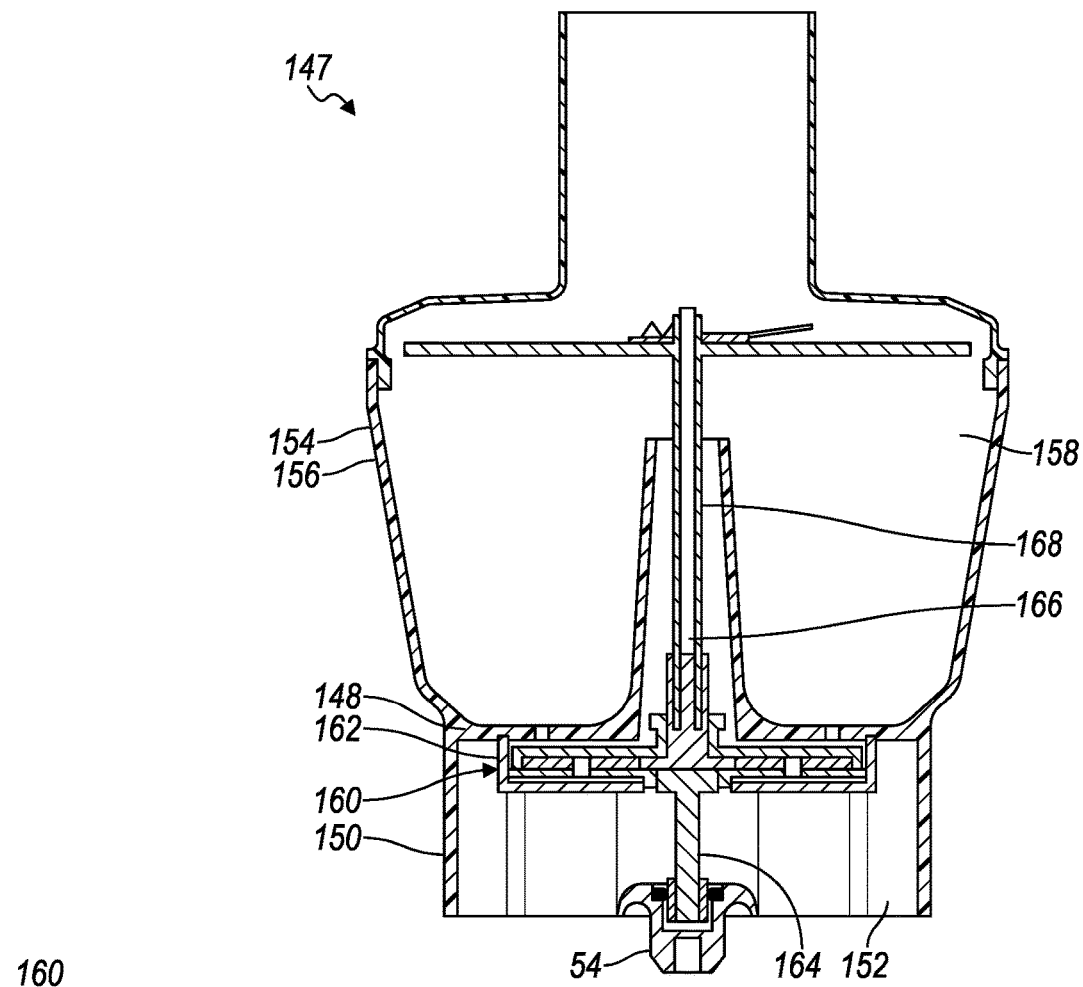
FIG. 11 is a side section view of a food processor assembly according to another embodiment.

FIG. 11 illustrates a food processor assembly 147 according to another embodiment. The food processor assembly 147 includes a substrate 148 with a lower sidewall 150 for resting on the blender base 22 and concealing the coupling 54 within a cavity 152. The food processor assembly 147 includes a bowl 154 with a sidewall 156 formed integrally with the substrate 148 to provide a bowl cavity 158 to receive processed food items. A transmission 160 is provided with a transmission housing 162 mounted to the substrate 148 within the lower cavity 152. The transmission 160 includes an input shaft 164 connected to the coupling 54. The transmission also includes a coaxial pair of output shafts 166, 168.

Figure 12:
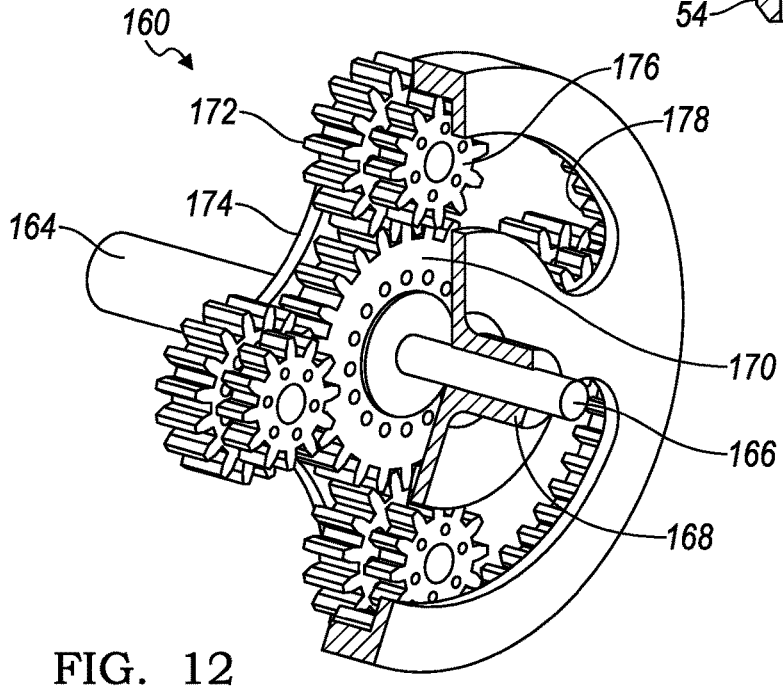
FIG. 12 is a fragmentary perspective view of a transmission of the food processor assembly of FIG. 11.

FIG. 12 illustrates the transmission 160 in greater detail. The input shaft 164 drives a sun gear 170. The sun gear 170 is engaged to a first plurality of planet gears 172. The first planet gears 172 are each pivotally connected to a planet carrier 174, which is supported for rotation by the transmission housing 162. The first planet gears 172 engage a fixed internal ring gear (not shown) in the transmission housing 162 so that rotation of the sun gears 170 imparts rotation to the first planet gears 172, which consequently revolve around the fixed internal ring gear and thereby rotate the planet carrier 174. The planet carrier 174 is connected to the central rotary output shaft 166 and thereby imparts rotation to the central rotary output shaft 166. The planetary gear transmission 160 includes a quantity of four planet gears 172, however any suitable quantity is contemplated.

A plurality of second planet gears 176 are each mounted for rotation upon the planet carrier and connected to the first plurality of planet gears 172 to rotate with the first plurality of planet gears 172. According to an embodiment, each second planet gear 176 may be formed integrally with a corresponding first planet gear 172. The second planet gears 176 are engaged with an internal ring gear 178 that supported for rotation within the transmission housing 162. The internal ring gear 178 is connected to and drives the hollow rotary output shaft 168. Therefore, the rotary input from the blender base 22 is imparted upon the input shaft 164 and reduced to two lower output speeds, and consequently higher torques, at the central rotary output shaft 166 and the hollow rotary output shaft 168.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A food processor assembly comprising:
   a bowl with a substrate, and a sidewall to collectively define a bowl cavity to receive food products;
   a planetary gear transmission supported upon the bowl substrate with a rotary input shaft, a first transmission rotary output extending into the bowl cavity to provide a first reduced rotation from the rotary input shaft, and a second transmission rotary output extending into the bowl cavity to provide a second reduced rotation from the rotary input shaft, the planetary gear transmission further comprising:
      a sun gear formed on a proximal end of the rotary input shaft,
      a stationary ring gear,
      a first plurality of planet gears in engagement with the sun gear and an inner circumference of the stationary ring gear,
      a planet carrier coupled to each of the first plurality of planet gears to support the rotation of the planet carrier relative the stationary ring gear, the first transmission rotary output being driven by the planet carrier,
      a second plurality of planet gears each connected to and coaxial with one of the first plurality of planet gears,
      a rotating ring gear, an inner circumference of the rotating ring gear in engagement with the second plurality of planet gears, the second transmission rotary output being driven by the rotating ring gear; and
   a blade connected to the first transmission rotary output or the second transmission rotary output for rotation relative to the bowl substrate to perform a cutting operation to a food product.

2. The food processor assembly of claim 1 further comprising:
   a blender base sized to support the bowl substrate; and
   a blender rotary output shaft with a splined receptacle sized to receive the rotary input shaft.

3. The food processor assembly of claim 2 further comprising:
   a near-field communication sensor for detecting an identification and installment orientation of the blade; and
   a controller in communication with the sensor and programmed to:
      receive input indicative of the identification and installment orientation of the blade, and
      select the blender a blender rotary output rotation associated with a cutting operation in response to the receipt of the input indicative of the identification and installment orientations of the blade.

4. The food processor assembly of claim 1 wherein the first transmission rotary output further comprises an output shaft extending from the planet carrier.

5. The food processor assembly of claim 1 wherein the bowl is further defined as a primary bowl; and
   wherein the food processor assembly further comprises a secondary bowl sized to be received within the primary bowl and connected to the first transmission rotary output to rotate relative to the primary bowl, along with the blade.

6. The food processor assembly of claim 1 wherein the blade has a first cutting edge formed adjacent the first transmission rotary output to perform a continuous cutting operation to the food products; and
   wherein the blade has a second cutting edge spaced radially from the first transmission rotary output to perform a sequential cutting operation to the food products.

7. The food processor assembly of claim 1, wherein the first transmission rotary output shaft is rotated concurrently with the second transmission rotary output shaft.

8. A food processor assembly comprising:
   a bowl with a substrate, and a sidewall to collectively define a bowl cavity to receive food products;
   a planetary gear transmission supported upon the bowl substrate with an input shaft, a fixed ring gear fixed relative to the bowl substrate, a rotary ring gear rotatable relative to the bowl substrate, a first transmission rotary output shaft extending into the bowl cavity to provide a first reduced rotation from the input shaft based on the fixed ring gear, and a second transmission rotary output shaft extending into the bowl cavity to provide a second reduced rotation from the input shaft that is different from the first reduced rotation based on the rotary ring gear, wherein the first transmission rotary output shaft has a distal end with a first interface, and wherein the second transmission rotary output shaft has a distal end that with a second interface that is different from the first interface;
   a first blade with a first interface to only connect to the first interface of the first transmission rotary output shaft for rotation relative to the bowl substrate at the first reduced rotation to perform a first cutting operation to a first food product; and
   a second blade with a second interface to only connect to the second interface of the second transmission rotary output shaft for rotation relative to the bowl substrate at the second reduced rotation to perform a second cutting operation to a second food product.

9. The food processor assembly of claim 8 wherein the transmission further comprises:
   a sun gear formed on a proximal end of the input shaft;
   a first plurality of planet gears in engagement with the sun gear and the fixed ring gear;
   a planet carrier supported for rotation in the transmission, the planet carrier supporting the first plurality of planet gears for rotation relative to the planet carrier, wherein the first transmission rotary output shaft extends from the planet carrier, and is driven by the planet carrier; and
   a second plurality of planet gears each coaxial with and connected to one of the first plurality of planet gears, the second plurality of planet gears in engagement with the rotary ring gear, the second transmission rotary output shaft extending from the rotary ring gear, and being driven by the rotary ring gear.

10. The food processor assembly of claim 8, wherein the second transmission rotary output shaft is coaxial with the first transmission rotary output shaft.

11. The food processor assembly of claim 8 wherein the first interface of the first transmission rotary output shaft is a splined distal end; and
   wherein the second interface of the second transmission rotary output shaft is a splined distal end with a diameter that is different than the splined distal end of the first rotary output shaft.

\* \* \* \* \*